United States Patent
Scudder et al.

(10) Patent No.: US 6,178,753 B1
(45) Date of Patent: Jan. 30, 2001

(54) CONTAINER WITH SELF-HEATING MODULE HAVING LIQUID REACTANT AND BREAKABLE REACTANT BARRIER AT DISTAL END OF MODULE

(75) Inventors: James A. Scudder, Poway; James L. Berntsen, Ramona, both of CA (US)

(73) Assignee: Ontro, Inc., Poway, CA (US)

( * ) Notice: Under 35 U.S.C. 154(b), the term of this patent shall be extended for 0 days.

(21) Appl. No.: 09/294,926

(22) Filed: Apr. 19, 1999

(51) Int. Cl.[7] .................................................. F25D 5/00
(52) U.S. Cl. .............................. 62/4; 62/293; 126/263.08
(58) Field of Search .................... 62/4, 293; 126/263.05, 126/263.06, 263.08–263.09

(56) References Cited

U.S. PATENT DOCUMENTS

| | | |
|---|---|---|
| 2,746,265 * | 5/1956 | Mills .......................................... 62/4 |
| 3,213,932 | 10/1965 | Gottfurcht et al. . |
| 3,874,557 | 4/1975 | Porter . |
| 3,970,068 * | 7/1976 | Sato ................................. 126/263.01 |
| 4,501,259 | 2/1985 | Apellaniz . |
| 4,741,324 | 5/1988 | Ina et al. . |
| 4,762,113 | 8/1988 | Hamasaki . |
| 4,784,113 | 11/1988 | Nagai et al. . |
| 4,784,678 * | 11/1988 | Rudick et al. .............................. 62/4 |
| 4,802,343 * | 2/1989 | Rudick et al. .......................... 62/294 |
| 4,895,135 | 1/1990 | Hamasaki . |
| 5,461,864 | 10/1995 | Scudder et al. . |
| 5,465,707 | 11/1995 | Fulcher et al. . |
| 5,483,949 | 1/1996 | James . |
| 5,542,418 | 8/1996 | James . |
| 5,555,741 | 9/1996 | Oakley . |
| 5,626,022 | 5/1997 | Scudder et al. . |
| 5,809,786 | 9/1998 | Scudder et al. . |

* cited by examiner

*Primary Examiner*—William Doerrler
(74) *Attorney, Agent, or Firm*—Brown, Martin, Haller & McClain, LLP

(57) ABSTRACT

A self-heating or self-cooling container has a container body, a closure at one end of the body through which the contents of the container can be consumed, and a thermic module at the other end of the body having an actuator portion and an elongated reaction chamber portion that extends distally into the container body and contains a liquid reactant relatively more distally from the actuator portion than a solid reactant separated from the liquid reactant by a breakable barrier. When a user actuates the thermic module, an elongated actuator member punctures the barrier. The user can then immediately invert the container, allowing the liquid reactant to drain through the puncture into the solid reactant in the reaction chamber. The reactants mix and produce a reaction that, depending upon the reactants, either heats or cools the container contents by conduction through the thermic module wall. An advantage is that the user does not need to wait to invert the container after actuating it. Rather, the user can actuate the container, immediately invert it, wait until the contents reach the desired temperature, and consume the contents through the closure.

11 Claims, 2 Drawing Sheets

CONTAINER WITH SELF-HEATING MODULE HAVING LIQUID REACTANT AND BREAKABLE REACTANT BARRIER AT DISTAL END OF MODULE

BACKGROUND OF THE INVENTION

1. Field of the Invention

The present invention relates generally to containers that include an internal chemical-based module that heats or, alternatively, cools the material, such as a food, beverage, medicine, or the like, in the surrounding container.

2. Description of the Related Art

Containers may have integral modules for warming materials in the container, such as Japanese sake, coffee, or soup. Examples of such self-heating containers are disclosed in U.S. Pat. Nos. 5,461,867 and 5,626,022, issued to Scudder et al. Such containers typically include an outer can or body, in which the food or beverage is sealed, and an inner can orthermic module that contains two chemical reactants that are stable when separated from one another but, when they mix in response to actuation of the thermic module by a user, produce an exothermic reaction or, alternatively, an endothermic reaction and thereby heat or cool the contents of the container.

The heating or cooling module (thermic module) is typically attached at one end of the cylindrical container body, and the elongated cylindrical reaction chamber portion of the module extends into the container body. This elongated portion functions as both a chamber in which to contain the reaction and a heat-exchanger for transferring heat between it and the surrounding contents of the container body. The thermic module has two chambers, each of which contains one of the chemical reactants, separated by a breakable barrier such as metal foil. Typically, one of the reactants is a liquid, and the other is in a powdered or granular solid form. Calcium oxide and water are examples of two reactants known to produce an exothermic reaction in such containers to heat the contents. Other combinations of reactants are known to produce endothermic reactions to cool the container contents. A cap containing the liquid reactant is disposed in the end of the thermic module attached to the container body. At one end of the cap is an actuator button that a user may depress to initiate the heating or cooling. The barrier seals the other end of the cap. The cap has a pushrod or similar prong-like member that extends from the actuator button nearly to the barrier. Depressing the actuator button forces the prong into the barrier, puncturing it and thereby allowing the liquid reactant to flow into the solid reactant in the reaction chamber. The heat produced by the resulting exothermic reaction (or, alternatively, used by a resulting endothermic reaction) is transferred between the reaction chamber of the thermic module and the contents of the container body by conduction. The elongated portion of the module body that defines the reaction chamber may be fluted or pleated to promote such heat conduction. Exothermic reactions also typically generate a gas and/or steam, which is allowed to escape through vents in the end of the container. The user inverts the container and, when the contents have reached the desired temperature, consumes the contents. The second end of the container body has a seal or closure, such as conventional beverage can pull-tab or pop-top, that may be opened and through which the user may consume the heated or cooled contents.

Instructions printed on the container may advise the user to wait some period of time, such as 30 seconds, before inverting the container, because all of the water or other liquid reactant may not have drained through the puncture in the barrier into the reaction chamber if the user inverts the container too soon after actuating it. After inversion, any water remaining in the module cap behind the punctured barrier may not completely mix with the solid reactant because, while water can flow relatively unimpeded through the puncture, the solid reactant can not.

A potential problem is that most persons have difficulty judging the period of time specified in the container instructions. Many persons erroneously believe they can accurately judge when 30 seconds or a similar time period has elapsed without the aid of a clock or wristwatch and, consequently, do not bother to use one. Also, typical users of self-heating beverage containers are those who may be out of doors, on the go, or otherwise do not have convenient and immediate access to a timepiece. It would be desirable to eliminate the need for a user to wait a specified period of time before inverting a self-heating container of the type described above. These problems and deficiencies are clearly felt in the art and are solved by the present invention in the manner described below.

SUMMARY OF THE INVENTION

The present invention relates to a container having a container body, a closure atone end of the body through which the contents of the container can be consumed, and a thermic module at the other end of the body having an actuator portion and an elongated reaction chamber portion that extends distally into the container body and contains a liquid reactant relatively more distally from the actuator portion than a solid reactant separated from the liquid reactant by a breakable barrier. The food, beverage, medicine or other material to be heated or cooled is contained in a material cavity in the container body. The container body may have any suitable generally elongated shape, such as cylindrical or can-shaped, bottle-shaped, or bowl-shaped.

When a user actuates the thermic module, an elongated actuator member coaxially oriented in the elongated reaction chamber moves in an axial direction and punctures the barrier. The user can then immediately invert the container, allowing the liquid reactant to drain through the puncture into the solid reactant in the reaction chamber. The reactants mix and produce a reaction that, depending upon the reactants, either produces heat, i.e., an exothermic reaction, and thereby heats the container contents, or uses heat, i.e., an endothermic reaction, and thereby cools the container contents. An advantage of the present invention is that the user does not need to wait to invert the container after actuating it. Rather, the user can actuate the container, immediately invert it, wait until the contents reach the desired temperature, and consume the contents through the closure.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein.

DESCRIPTION OF A PREFERRED EMBODIMENT

Figure 4:
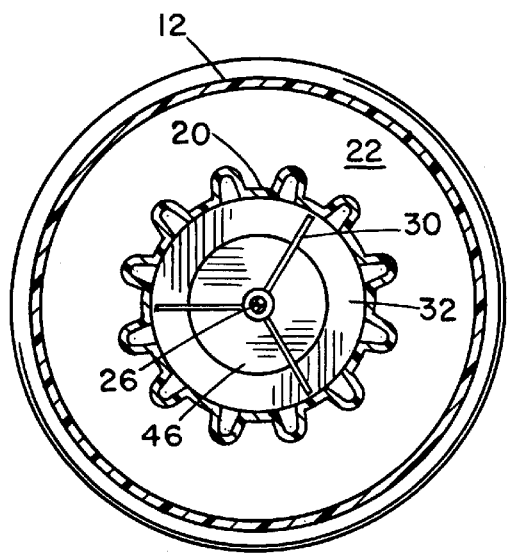
FIG. 4 is a sectional view taken on line 4—4 of FIG. 1.

A container 10 includes a container body 12 and a thermic module 14 that transfers heat between it and the contents 16 of container 10. Although any of a variety of manufacturing methods and materials may be suitable, container body 12 is preferably made of blow-molded food-grade plastic. Thermic module 14 includes a thermic module cap 18 and a thermic module body 20. Module body 20 is joined to container body 12 by a suitable plastic welding process. Nevertheless, in other embodiments module body 20 may alternatively be formed unitarily with container body 12 as portions of a unitary molded body. The elongated portion of module body 20 that functions as a heat-exchanger is preferably fluted or pleated to promote heat transfer. (See FIG. 4.) Contents 16, which may be a beverage, food, medicine or any other suitable material, are contained in a material chamber 22.

Module cap 18 is press-fit in the proximal end of module body 20. A gasket or filter ring 23 is disposed between the adjoining surfaces of module cap 18 and module body 20 as described in U.S. Pat. No. 5,809,786, incorporated herein by this reference. Nevertheless, in other embodiments module cap 18 may alternatively be retained in the opening of module body 20 by a retaining ring crimped over a flange (not shown) in the end container body 12. Cap 18 has an actuator disc 24 formed in it that flexes inwardly, i.e., toward the distal end of module body 20, when depressed by a user. Although not shown for purposes of clarity, cap 18 preferably includes vent channels through which gas can escape during the reaction. (See U.S. Pat. Nos. 5,461,867 and 5,626,022, incorporated herein by this reference in their entireties.)

A pushrod 26 is disposed coaxially within module body 20. One end of pushrod 26 abuts an indentation in the interior surface of module cap 18. The other end extends distally into module body 20. Two guide members 28 and 30 are spaced along pushrod 26. Each of guide members 28 and 30 has three spokes that extend radially from pushrod 26 to the interior walls of module body 20 to brace pushrod 26 in a coaxial orientation.

A breakable barrier 32 made of metal foil is adhesively attached a flange formed inside the distal end of the elongated portion of module body 20. The interior of this portion of module body 20 defines a reaction chamber. Water or other liquid reactant 34 is contained in module body 20 between barrier 32 and the distal end of module body 20. The solid reactant 36, such as calcium oxide, is contained in module body 20 between barrier 32 and the proximal end of module body 20. To minimize the likelihood of damaging barrier 32 during manufacturing, pushrod 26 is preferably inserted into module body 20 prior to filling module body 20 with solid reactant 36. Because module cap 18 is advantageously a separate part from pushrod 26, filter ring 23 and module cap 18 can then be inserted into the end of module body 20 to seal the reaction chamber.

An endcap or lid 38 with a pop-top closure 40 of the type commonly used in beverage cans is crimped over the lip or flange 42 at the other end of container body 12.

Figure 1:
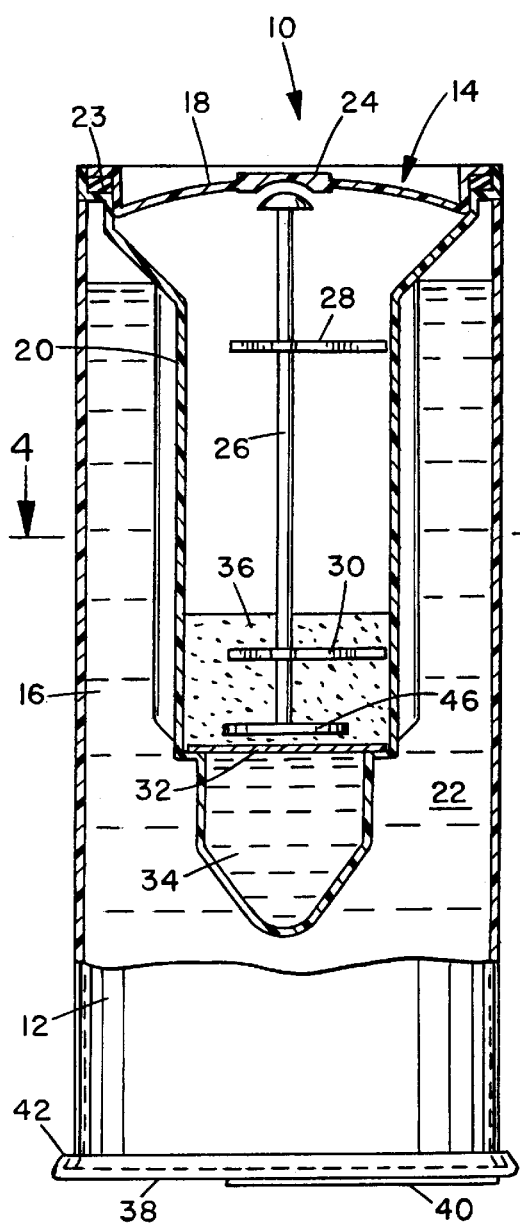
FIG. 1 is a side view of the container, partially cut-away.
Figure 2:
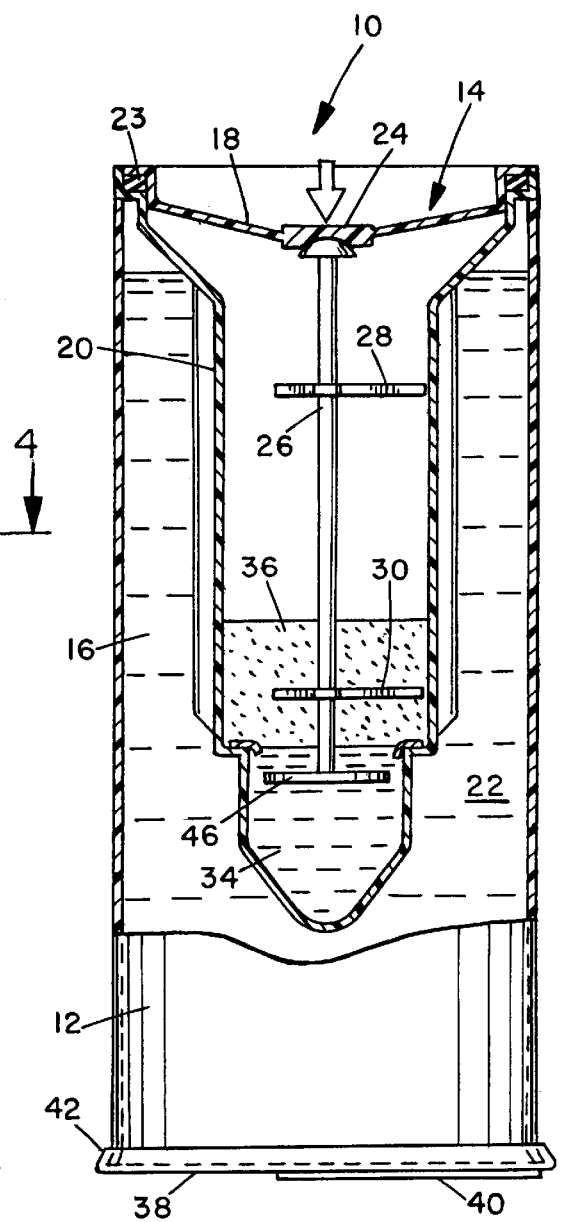
FIG. 2 is similar to FIG. 1, showing the container after actuation.

To actuate the container, the user depresses actuator disc 24 in the direction of the arrow shown in FIG. 2. In response to such a longitudinally or axially directed force, the center portion of module cap 18 flexes inwardly or distally with respect to module body 20. This flexure urges pushrod 26 distally. A disc 46 at the distal end of pushrod 26 punctures barrier 32. The disc-like or other blunted shape is advantageous because it minimizes the likelihood of damaging barrier 32 prior to actuation. The user can then immediately invert container 10. Unlike prior containers, in which mixing of the reactants occurs prior to inversion, there is no need to wait to allow the reactants to mix, because mixing occurs after container 10 is inverted.

Figure 3:
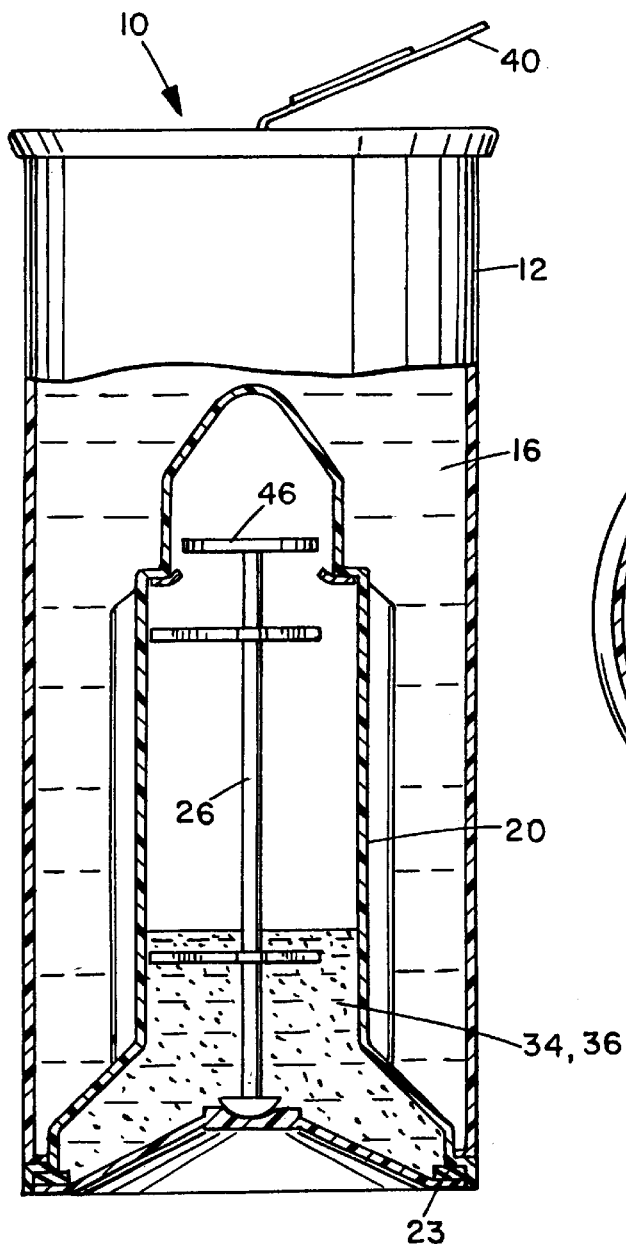
FIG. 3 is similar to FIGS. 1 and 2, showing the container inverted in preparation for consuming the heated or cooled contents.

As illustrated in FIG. 3, after container 10 has been inverted, liquid reactant 34 flows through the puncture and mixes with solid reactant 36 in the reaction chamber. The resulting reaction either produces heat to cause contents 16 to be heated or uses heat to cause contents 16 to be cooled, depending upon the nature of the reactants. Heat is transferred by conduction through the wall of module body 20, which may be fluted or pleated (not shown for purposes of clarity) to maximize its surface area and the resulting conduction rate. Thus, for example, if the reaction is exothermic, contents 16 are heated. When contents 16 have reached the desired temperature, the user can open pop-top closure 40 to access and consume contents 16.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

What is claimed is:

1. A container for selectably changing the temperature of its contents by mixing two reactants, comprising:

a container body having a material chamber for containing said contents, a first end having a releasable closure for access to the contents of said material chamber, and a second end;

a thermic module having an actuator at a proximal end attached to said second end of container body and an elongated portion extending distally into said material chamber towards the first end of said container body, said actuator having an elongated puncturing member extending distally into said elongated portion of said thermic module, said puncturing member movable from a retracted position to an extended position in response to a user applying a force to a portion of said actuator with said container body in a first upright orientation in which said second end of said container body is uppermost; and a breakable barrier in said thermic module interposed between a first chamber in said thermic module containing a liquid reactant and a second chamber in said thermic module containing a solid reactant, said first chamber disposed relatively more distally from said proximal end than said second chamber and closer to said first end of said container body than said second chamber, said puncturing member extending toward said breakable barrier and breaking said barrier to allow mixing of said reactants when said puncturing member moves to said extended position and said container body is inverted into a second upright orientation in which said first end of said container body is uppermost, allowing said liquid reactant to flow downwardly through said breakable barrier into said second chamber.

2. A container for selectably changing the temperature of its contents by mixing two reactants, comprising:

a container body having a material chamber for containing said contents;

a thermic module having an actuator at a proximal end attached to said container body and an elongated portion extending distally into said material chamber, said actuator having an elongated puncturing member extending distally into said elongated portion of said thermic module, said puncturing member movable from a retracted position to an extended position in response to a user applying a force to a portion of said actuator;

a breakable barrier in said thermic module interposed between a first chamber in said thermic module containing a liquid reactant and a second chamber in said thermic module containing a solid reactant, said first chamber disposed relatively more distally from said proximal end than said second chamber, said puncturing member extending toward said breakable barrier and breaking said barrier to allow mixing of said reactants when said puncturing member moves to said extended position; and said elongated portion of said thermic module having an internal flange, said breakable barrier being attached at its periphery to said flange.

3. The container recited in claim 2, wherein said flange is defined by a step between portions of said thermic module having different diameters.

4. The container recited in claim 1, wherein said thermic module comprises an elongated module body not unitarily formed with said container body and having an open end attached to an open end of said container body, and a portion of said actuator is disposed in said open end of said module body.

5. A container for selectable changing the temperature of its contents by mixing two reactants, comprising:

a container body having a material chamber for containing said contents;

a thermic module having an actuator at a Proximal end attached to said container body and an elongated portion extending distally into said material chamber, said actuator having an elongated puncturing member extending distally into said elongated portion of said thermic module, said puncturing member movable from a retracted position to an extended position in response to a user applying a force to a portion of said actuator;

a breakable barrier in said thermic module interposed between a first chamber in said thermic module containing a liquid reactant and a second chamber in said thermic module containing a solid reactant, said first chamber disposed relatively more distally from said proximal end than said second chamber, said puncturing member extending toward said breakable barrier and breaking said barrier to allow mixing of said reactants when said puncturing member moves to said extended position;

said thermic module comprising an elongated module body not unitarily formed with said container body and having an open end attached to an open end of said container body, and a portion of said actuator is disposed in said open end of said module body; and said actuator comprising an actuator disc and a separate actuator rod, said actuator disk being disposed in said open end of said module body, and a proximal end of said actuator rod abutting a surface of said actuator disc.

6. The container recited in claim 5, wherein said actuator rod has a guide member extending radially with respect to a longitudinal axis of said actuator rod to an interior wall of said elongated module body.

7. The container recited in claim 6, wherein said actuator rod has a plurality of guide members longitudinally spaced from one another, each extending radially with respect to a longitudinal axis of said actuator rod to an interior wall of said elongated module body.

8. A container for selectably changing the temperature of its contents by mixing two reactants, comprising:

a container body having a material chamber for containing said contents, a proximal end, and a distal end having an openable closure for access to the contents of said container;

thermic module means having a proximal end at the proximal end of said container body and an elongated portion extending distally into said material chamber, said thermic module for containing a solid reactant and a liquid reactant that thermally react upon mixing, said thermic module having an actuator means for initiating mixing of said reactants; and barrier means in said thermic module means interposed between a first chamber in said thermic module means containing said liquid reactant and a second chamber in said thermic module means containing said solid reactant, said first chamber disposed relatively more distally from said proximal end than said second chamber, said actuator means opening said barrier means to allow mixing of said reactants in response to actuation by a user and orienting of said container body upright with said distal end uppermost, whereby the liquid reactant can flow downwardly from said first chamber into said second chamber.

9. A method for using a container for selectably changing the temperature of its contents by mixing two reactants, the container comprising a container body, a thermic module, and a breakable barrier in said thermic module, said container body having a material chamber for containing said contents, said thermic module having an actuator at a proximal end attached to said container body and an elongated portion extending distally into said material chamber, said actuator having an elongated puncturing member extending distally into said elongated portion of said thermic module, said breakable barrier in said thermic module interposed between a first chamber in said thermic module containing a liquid reactant and a second chamber in said thermic module containing a solid reactant, said first chamber disposed relatively more distally from said proximal end than said second chamber, the method comprising the steps of:

orienting said container with said proximal end of said thermic module elevated higher than other portions of said thermic module;

applying a force to a portion of said actuator to urge said puncturing member downwardly through said breakable barrier, creating a puncture in said breakable barrier;

inverting said container to allow said liquid reactant to flow downwardly through said puncture and mix with said solid reactant; and opening said closure to access said contents.

10. The container recited in claim 5, wherein each guide member has a plurality of radial spokes.

11. The container recited in claim 5, wherein one of said guide members is disposed at a distal end of said actuator rod.

* * * * *